No. 705,923. Patented July 29, 1902.
A. N. HADLEY.
CUTTER FOR CORN HARVESTERS.
(Application filed Feb. 5, 1901.)
(No Model.)
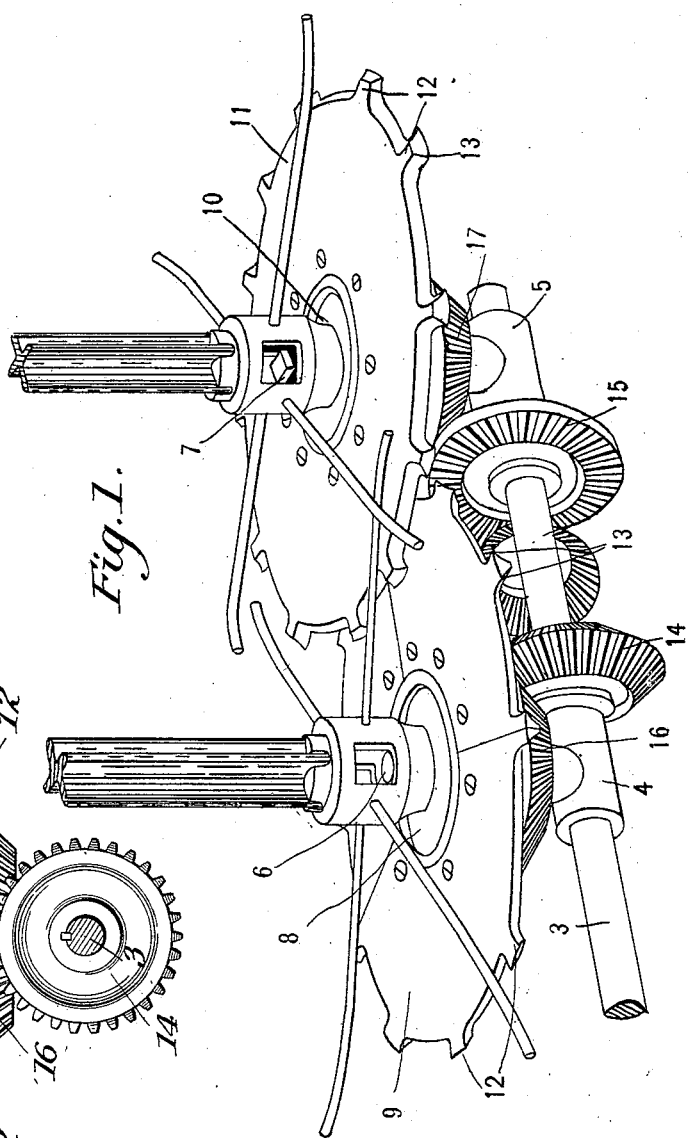
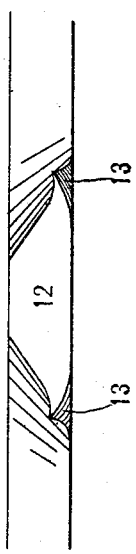
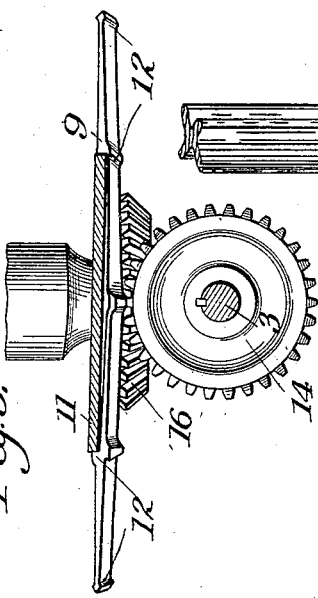
Witnesses
Frank A Fahle
Bertha M. Ballard
Inventor
Artemus N. Hadley
By
Arthur M. Hood
Attorney
THE NORRIS PETERS CO., PHOTO-LITHO., WASHINGTON, D. C.

UNITED STATES PATENT OFFICE.

ARTEMUS N. HADLEY, OF INDIANAPOLIS, INDIANA.

CUTTER FOR CORN-HARVESTERS.

SPECIFICATION forming part of Letters Patent No. 705,923, dated July 29, 1902.

Application filed February 5, 1901. Serial No. 46,057. (No model.)

*To all whom it may concern:*

Be it known that I, ARTEMUS N. HADLEY, a citizen of the United States, residing at Indianapolis, in the county of Marion and State of Indiana, have invented a new and useful Cutter for Corn-Harvesters, of which the following is a specification.

My invention relates to an improvement in cutters for corn-harvesters.

The object of my invention is to provide various changes in the arrangement and form of the cutters shown in Patent No. 432,750, issued to me July 23, 1900.

The accompanying drawings illustrate my invention.

Figure 1 is a view in perspective of a pair of coöperating cutters and the adjacent parts. Fig. 2 is a detail showing on a larger scale the peculiar formation of the cutting edges. Fig. 3 is a vertical section on a plane between the two cutter-shafts.

In the drawings, 3 indicates a drive-shaft the outer end of which is supported in a pair of bearings 4 and 5. Bearing 4 is provided with an upwardly-extending stud 6, and bearing 5 is provided with a similar stud 7.

Rotatably mounted upon stud 6 is a cutter-head 8, to which are secured the several segments of a cutter 9, and mounted in a similar manner upon stud 7 is a cutter-head 10, upon which are secured the segments of a cutter 11. The cutters 9 and 11 are of the same general form as those shown in my above-mentioned patent, each consisting of several circular segments of radial arms 12 projecting therefrom, the periphery of the segments and the sides and ends of the arms 12 being beveled and brought to a cutting edge. In my previous patent the cutters were arranged one above the other and slightly overlapped, the two revolving in parallel planes. In such an arrangement there is a tendency to spread the two cutters apart, and in order to prevent this spreading of the cutters I mount them so as to revolve in planes which converge toward the front of the machine, so that while the cutting edges of the two cutters will lie close together at their point of meeting toward the front of the machine they will be slightly separated at the rear. This position of the two cutters may be obtained in several ways—as, for instance, by tilting stud 6 slightly to the rear and tilting stud 7 slightly to the front. If desired, the difference in the angle of the two cutters may be produced by care in babbitting the two bearings. With the cutters arranged in convergent planes there is some danger that the radial arms may become interlocked as they are brought toward each other. In order to prevent this, the outer cutting corner of each arm 12 is turned up slightly, as shown at 13, so that the points of the arms of one cutter may not pass beneath the points of the arms of the coöperating cutter. If desired, the other cutting edges of the radial arms may be ground off slightly, so that the outer cutting corners may lie slightly above the plane of the other cutting edges.

For the purpose of driving the cutters any desired form of gearing, such as the gears 14 and 15, secured to the shaft, and the gears 16 and 17, secured to the cutter-heads 8 and 10, respectively, may be used.

I claim as my invention—

1. As an article of manufacture, a disk cutter having a series of arms projecting from the periphery thereof, cutting edges formed upon the periphery of said disk, and the outer, forward, lower corner of each arm raised slightly above the plane of the cutting edge, substantially as described.

2. As an article of manufacture, a disk cutter having a series of arms projecting from the periphery thereof, cutting edges formed upon the periphery of said disk and upon the sides of said arms, and the lower corners of each arm raised slightly above the plane of the cutting edges, substantially as described.

ARTEMUS N. HADLEY.

Witnesses:
A. G. GRIFFIN,
W. B. HUBBARD.